(12) United States Patent
Bademian et al.

(10) Patent No.: US 6,597,506 B1
(45) Date of Patent: Jul. 22, 2003

(54) BIREFRINGENT OPTICAL DEVICES AND METHODS

(75) Inventors: Leon Bademian, Stafford, VA (US); Alex B. Stone, Vienna, VA (US)

(73) Assignee: Isomet, Inc., Springfield, VA (US)

( * ) Notice: Subject to any disclaimer, the term of this patent is extended or adjusted under 35 U.S.C. 154(b) by 0 days.

(21) Appl. No.: 09/898,087

(22) Filed: Jul. 5, 2001

(51) Int. Cl.$^7$ ................................................. G02B 5/30
(52) U.S. Cl. ........................ 359/497; 359/495; 359/498; 359/500; 359/280
(58) Field of Search ................................ 359/494, 495, 359/497, 498, 500, 280

(56) References Cited

U.S. PATENT DOCUMENTS 5,933,269 A * 8/1999 Robinson .................... 359/280
6,335,830 B1 * 1/2002 Chang et al. ................ 359/498

\* cited by examiner

Primary Examiner—Audrey Chang
Assistant Examiner—Craig Curtis
(74) Attorney, Agent, or Firm—Morgan, Lewis & Bockius LLP

(57) ABSTRACT

An optical device includes a first birefringent crystal having a refractive index difference $\Delta n_1$ and a length $l_1$ and a second birefringent crystal having a refractive index difference $\Delta n_2$ and a length $l_2$. The first and second birefringent crystals are optically aligned and oriented so that a face of the first birefringent crystal and a face of the second birefringent crystal permit at least one optical beam to enter the face of the first birefringent crystal, pass through the first birefringent crystal, enter the face of the second birefringent crystal, and pass through the second birefringent crystal The face of the first birefringent crystal and the face of the second birefringent crystal are tilted relative to each other. The tilting adjusts at least the path length of optical beam through the first birefringent crystal, thereby permitting a precisely tuned frequency response without requiring corresponding precision in the length of the crystals. The first and second birefringent crystals may be temperature compensated whereby a temperature variation of the product of the refractive index difference $\Delta n_1$ and the length $l_1$ is compensated by a temperature variation of the product of the refractive index difference $\Delta n_2$ and the length $l_2$ over a desired operating temperature range.

34 Claims, 5 Drawing Sheets

BIREFRINGENT OPTICAL DEVICES AND METHODS

FIELD OF THE INVENTION

The present invention relates to birefringent optical devices and methods.

BACKGROUND OF THE INVENTION

The demand for telecommunication transport services has increased over recent years, primarily due to the increase in information transfer between computers. New multimedia applications and smart appliances are expected to increase demands on telecommunication networks in the coming years. Telecommunications service providers have sought to meet future demand by installing optical telecommunications systems. Optical telecommunications systems use light to carry information. Light advantageously can be used to carry large volumes of information at very high speeds.

Some optical transmission systems use wavelength division multiplexing (WDM) to increase the volume of information they can carry. WDM systems transmit multiple colors or wavelengths of light simultaneously to carry information, much like different radio channels carry different radio programs. Each wavelength or color of light represents one channel. To further increase the amount of information that can be transferred, the channels in some WDM systems are spaced very close together, for example, 50 GHz. Even closer channels spacings of 12.5–25 GHz are forecasted.

To receive or route optical signals in the WDM system, optical equipment is needed to distinguish between the different optical transmission channels, much like a radio tuner distinguishes between signals from different radio stations. An optical device capable of distinguishing between optical channels in a WDM system is an optical filter. For example, one known optical filter is a Solc-type filter made up of one or more high order birefringent waveplates stacked between optical polarizers. The optical filter can be designed to have periodic passbands. Frequencies of an optical signal located within the passbands pass through the filter. Frequencies outside of the passbands are cut off. The birefringent waveplates are used to shape and tune the passband(s) to particular frequencies. In particular, the position of the passbands of the optical filter depends, among other things, on the refractive index difference Δn of the birefringent material that forms the waveplates and the length l of the birefringent waveplates. The key to optical filter operation is to allow optical signals of selected optical channels to pass without significant losses, but to cut-off optical signals outside of the selected optical channels.

As the number of optical channels used in WDM systems increases, the passbands for optical filters need to be narrower and more precisely tuned. Several problems arise. First, both refractive index difference Δn and the length l of the waveplates change with temperature. Therefore, as temperature changes, the passbands of the optical filter shift. As a result, the optical filter may cut off or distort optical signals that should be passed and/or pass optical signals that should be cut off. In addition, it is difficult and expensive to manufacture waveplates with a highly precise length l. Even a slight variation in the length of the waveplates affects the location of the passband of the optical filter.

SUMMARY OF THE INVENTION

The present invention provides a stable, economical birefringent optical device capable of precision operation. The birefringent optical device may be used in an optical filter, may be part of WDM optical equipment, such as an add/drop device, dispersion compensator, a receiver, or other optical equipment.

The present invention also provides a method for manufacturing a stable birefringent optical device capable of precision operation.

The present invention also provides a method for tuning a birefringent optical device.

Additional features and advantages of the invention will be set forth in the description that follows, and in part will be apparent from the description, or may be learned by practice of the invention. The objectives and advantages of the invention will be realized and attained by the system and method particularly pointed out in the written description hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DESCRIPTION OF THE PREFERRED EMBODIMENTS

Reference will now be made in detail to the preferred embodiments of the present invention, examples of which are illustrated in the accompanying drawings.

Figure 1:
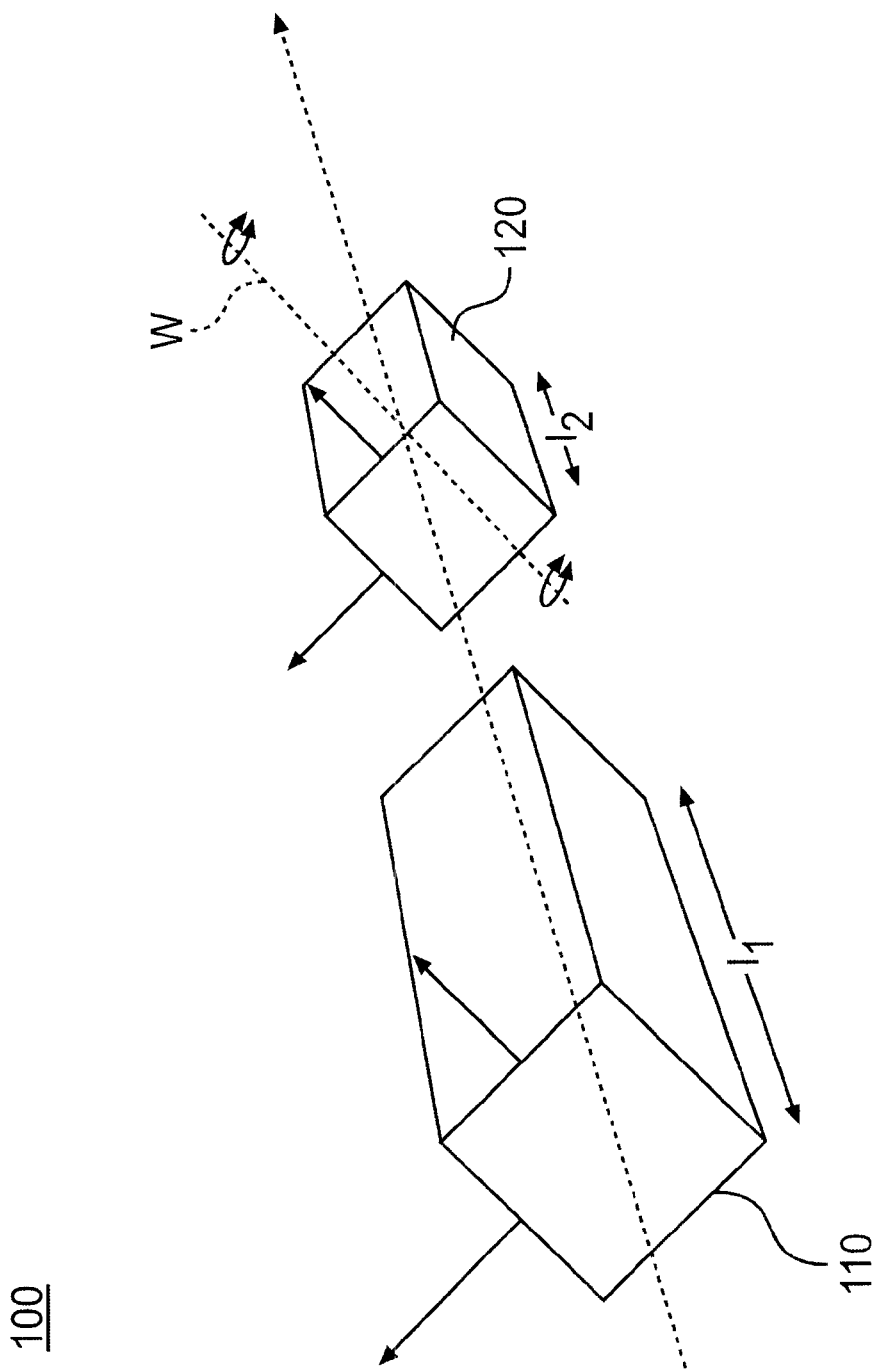
FIG. 1 illustrates a birefringent optical device in accordance with an exemplary embodiment the present invention.

FIG. 1 illustrates a birefringent optical device 100 in accordance with an exemplary embodiment of the present invention. As shown in FIG. 1, the optical device 100 includes a first birefringent crystal 110 and a second birefringent crystal 120. Birefringent crystals 110 and 120 are generally aligned with each other along an axis through which an optical signal may pass. Accordingly, an optical signal may be directed to pass through birefringent crystal 110, then through birefringent crystal 120 or in the opposite direction. Of course, other optical components may precede or follow birefringent crystals 110 and 120 in the path of an optical signal. For example, crystals 110 and 120 may be positioned between two polarizers to form a filter or between an polarization splitter and a polarization combiner, for example, as discussed below in connection with FIG. 5.

The optical signal may be, for example, a WDM optical signal having a plurality of wavelength channels. Each of the wavelength channels may carry a modulated optical information signal. It should be appreciated that not all of the wavelength channels are required to carry a modulated optical signal at a give time. Birefringent optical device 100 may also be used with other optical signals or light, such as the light from stars or other extraterrestrial bodies.

Birefringent crystals 110 and 120 are preferably located so that their optical axes are parallel (within tolerance) and so that an optical signal can pass through both crystals. As shown in FIG. 1, the fast axis of birefringent crystal 110 and the slow axis of birefringent crystal 120 are oriented perpendicular (within tolerance) of the direction of optical signal. However, this is simply one of several possible arrangements.

Birefringent crystal 110 has a length $l_1$ and a refractive index difference $\Delta n_1$ for light incident at a given angle. Birefringent crystal 120 has a length $l_2$ and a refractive index difference $\Delta n_2$ for light incident at a given angle. In general, different polarizations of light will pass through a birefringent material at different speeds. For example, light with a horizontal polarization will pass through the birefringent material at a first speed and light with a vertical polarization will pass through the birefringent material at a different speed. The first speed can be represented by $c/n_o$, where $n_o$ is an index of refraction for the horizontally polarized light and c is the speed of light in a vacuum. The second speed can be represented by $c/n_e$, where $n_e$ is an index of refraction for vertically polarized light. The refractive index difference $\Delta n$ represents the difference between the refractive index $n_o$ and the refractive index $n_e$ for the birefringent material.

As described in greater detail below, optical properties of the optical device 100, such as frequency response, depend on the product $\Delta n \cdot l$ for the birefringent crystals. Given the orientation of the first and second birefringent crystals 110 and 120 in FIG. 1, the net product $\Delta n \cdot l$ for the birefringent crystals 110 and 120 can be expressed as:

$$\Delta n \cdot l = \Delta n_1 \cdot l_1 - \Delta n_2 \cdot l_2$$

By selecting appropriate materials and crystal orientations for birefringent crystals 110 and 120, the net product $\Delta n \cdot l$ can be substantially constant over a desired temperature range without requiring active temperature compensation. In other words, as temperature changes, changes in $\Delta n_1 \cdot l_1$ are offset by changes in $\Delta n_2 \cdot l_2$, thereby keeping the net product $\Delta n \cdot l$ substantially constant. For example, when used in optical filters for narrow wavelength ranges, accuracies on the order of 10–100 parts per million or less can be achieved over temperature range of 60°–70° C. or more.

If birefringent crystals 110 and 120 were oriented with their fast axes substantially parallel (i.e., within tolerance for the application) or with their slow axes substantially parallel, then the net product $\Delta n \cdot l$ for the birefringent crystals 110 and 120 can be expressed as:

$$\Delta n \cdot l = \Delta n_1 \cdot l_1 + \Delta n_2 \cdot l_2$$

In this case, the material for birefringent crystals 110 and 120 should be selected so that $\Delta n_1$ varies with temperature in a direction opposite to that of $\Delta n_2$. Thus, as temperature changes, changes in $\Delta n_1 \cdot l_1$ are offset by changes in $\Delta n_2 \cdot l_2$, thereby keeping the net product $\Delta n \cdot l$ substantially constant. Accordingly, the net product $\Delta n \cdot l$ can be substantially constant over a desired temperature range without requiring active temperature compensation.

In general, birefringent crystal 110 may be any of several birefringent crystal materials. For example, crystal 110 may be made from $YVO_4$, $TeO_2$, $TiO_2$, $CaCO_4$, among other birefringent materials. Crystal 120 may be made from a material with a thermal coefficient useful in offsetting that of crystal 110. One suitable material is $PbMO_4$. $PbMO_4$ exhibits a relatively small $\Delta n$, but one with a strong and linear variation with temperature.

Assuming the net product $\Delta n \cdot l$ for the birefringent crystals is constant k, then:

$$k = \Delta n_1 \cdot l_1 - \Delta n_2 \cdot l_2$$

Taking the derivative as a function of temperature T:

$$0 = (\Delta n_1 \cdot \delta l_1/\delta T + l_1 \cdot \delta \Delta n_1/\delta T) - (\Delta n_2 \cdot \delta l_2/\delta T + l_2 \cdot \delta \Delta n_2/\delta T)$$

Rearranging the terms:

$$\Delta n_1 \cdot \delta l_1/\delta T + l_1 \cdot \delta \Delta n_1/\delta T = \Delta n_2 \cdot \delta l_2/\delta T + l_2 \cdot \delta \Delta n_2/\delta T$$

If $PbMO_4$ were used as the material for birefringent crystal 120, the $\Delta n$ of $PbMO_4$ depends strongly on temperature. Accordingly, the term $\delta \Delta n_2/\delta T$ is large and the thickness $l_2$ may be small, which reduces device size.

In addition to selecting the materials for birefringent crystals 110 and 120, the particular value of the net product $\Delta n \cdot l$ can be set precisely by controlling the thicknesses $l_1$ and $l_2$ of the crystals 110 and 120. For example, using current fabrication techniques, a crystal thickness l of 10 mm can be fabricated to a tolerance of, for example, ±3 μm. However, for most applications, more exacting tolerances, for example, of ±0.1 μm, are needed to achieve a desired spectral response of optical device 100. It can be expensive to achieve precise thicknesses l of the birefringent crystals. In accordance with an aspect of the present invention, one or more of birefringent crystals 110 and 120 are tilted to vary the effective $\Delta n \cdot l$ product. The effective net $\Delta n \cdot l$ product can thereby be set to the desired spectral response without requiring exacting tolerances in crystal thickness. Tilting a birefringent crystal changes the path length of light through the crystal(s) as well as producing a small change in $\Delta n$. As a result, the product $\Delta n \cdot l$ changes. In this way, the effective net product $\Delta n \cdot l$ can be precisely set with less exacting tolerances in the thickness l of the crystals. As should be clear, the effective net product $\Delta n \cdot l$ for the combination of crystals can be changed by tilting one or both of birefringent crystals 110 and 120.

For example, to vary the effective net product $\Delta n \cdot l$, one or both of birefringent crystals 110 and 120 may be tilted about an axis substantially perpendicular to the direction of light propagation. For example, the tilt axis may form an angle of 80°–110° relative to the direction of light propagation. If both crystals 110 and 120 are tilted, the tilt axes for each crystal may be parallel to each other. However, parallel tilt axes are not required.

Moreover, the tilt axis may pass through the crystal being tilted or may pass outside of the crystal. In either case, the tilt should be sufficient to adjust the product $\Delta n \cdot l$ of the crystal(s) being tilted. Further, tilting of crystals 110, 120 may also be achieved by adjusting the direction of light propagation. However, this may not be acceptable in some applications.

As shown in FIG. 1, crystal 120 is tilted about a tilt axis W that passes through crystal 120 and that corresponds to the slow axis of the crystal 120. In FIG. 1, crystal 110 is not tilted. The amount of tilt depends on the particular adjustment needed. For example, a tilt of ±4° may be sufficient for certain applications.

Figure 2:
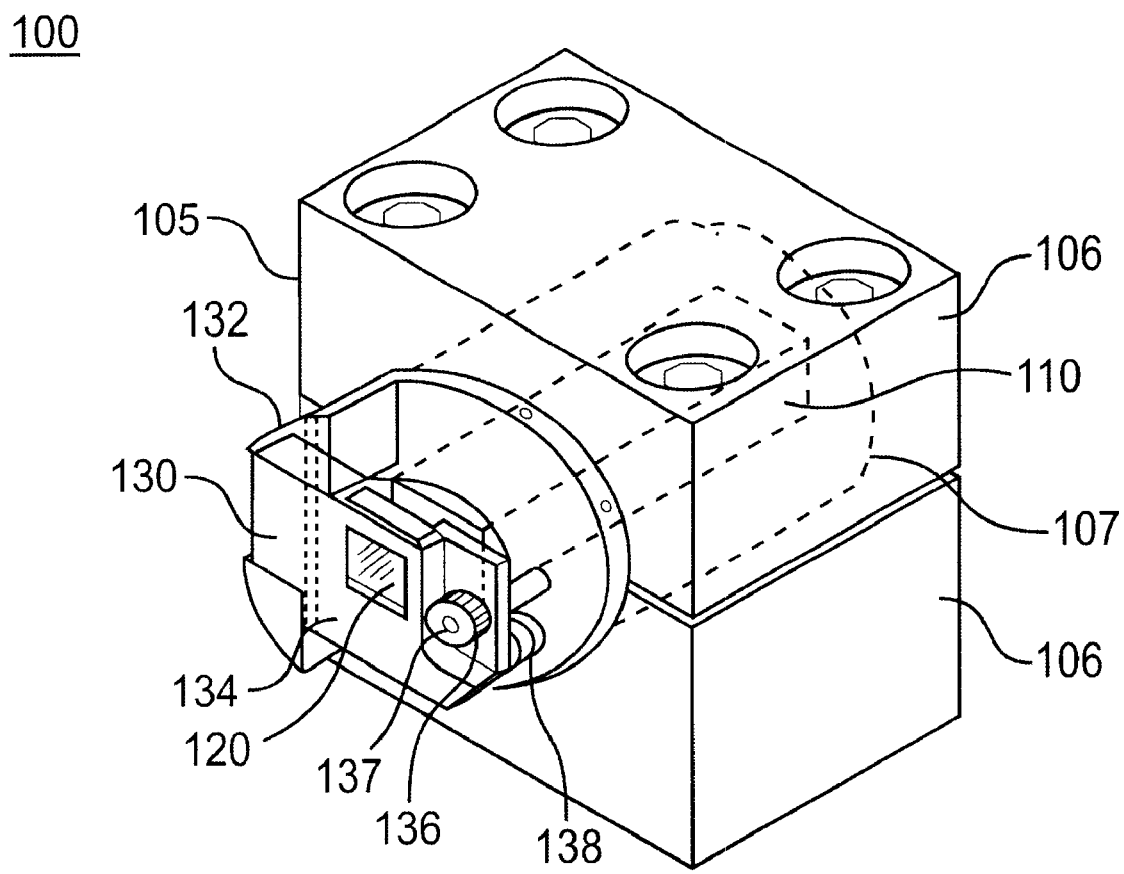
FIG. 2 illustrates a birefringent optical device in a holder in accordance with an exemplary embodiment of the present invention.

FIG. 2 illustrates an exemplary embodiment of birefringent optical device 100. As shown in FIG. 2, birefringent crystals 110 and 120 are held by a rotator block 105. FIG. 2 illustrates one embodiment of a holder 105. It should be understood that other arrangements are possible. Rotator block 105 includes a base 106 and a rotation cylinder 107 rotatable relative to base 106. Rotation cylinder 107 holds birefringent crystal 110. Birefringent crystal 120 is held by a tilting mechanism 130, which is secured to rotation cylinder 107. FIG. 2 shows one embodiment of the tilting mechanism 130. Tilting mechanism 130 includes a pivot 132, a tilting arm 134, and a tilt adjustment control 136. Tilting arm 134 may hold birefringent crystal 120 either directly or indirectly. Tilting arm 134 pivots about pivot 132, for example a hinge or a flexible member. As shown in FIG. 2, tilting arm 134 has a one-piece configuration. However, tilting arm 134 may be made of several components. Moreover, if tilting arm 134 were flexible, in whole or in part, tilting arm 134 may flex to permit birefringent crystal 120 to tilt.

Tilt adjustment control 136 controls the amount of tilt experienced by birefringent crystal 120. In the embodiment of FIG. 2, tilt adjustment control 136 includes thumbscrew 137 and a spring 138. Thumbscrew 137 may be inserted into a threaded hole in block 105 (such as in rotation cylinder 107) or another structure. Thumbscrew 137 preferably has a fine thread pitch so that a full rotation of thumbscrew 137 produces a small lateral movement, thereby permitting fine adjustments. Spring 138 forces tilting arm 134 away from block 105 and against thumbscrew 137. By turning thumbscrew 137 clockwise or counterclockwise, the tilt of the tilting arm 134, and thus the tilt of birefringent crystal 120, may be adjusted. The arrangement of FIG. 2 is intended to be exemplary. It should be understood that other arrangements may be used consistent with the present invention.

Figure 3:
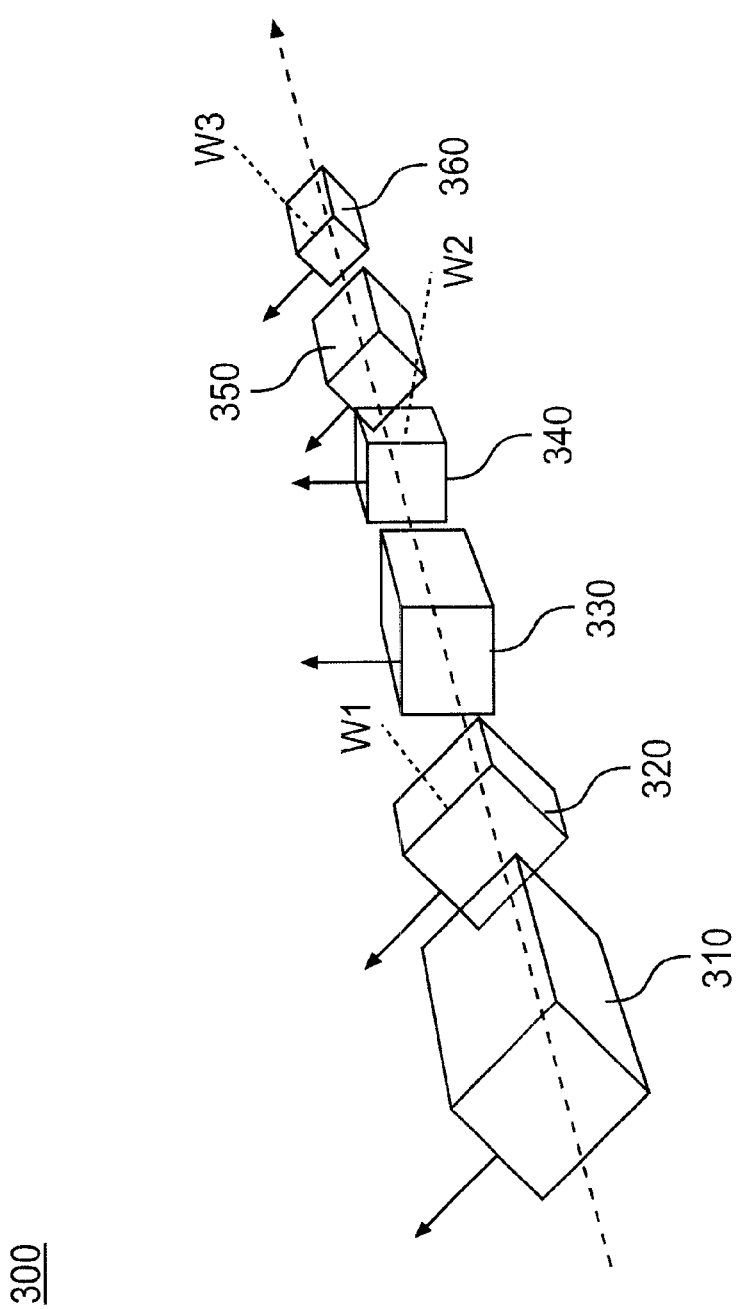
FIG. 3 illustrates a birefringent optical device in accordance with a further exemplary embodiment of the present invention.

FIG. 3 illustrates a further exemplary embodiment of an optical device in accordance with the present invention. As shown in FIG. 3, optical device 300 includes multiple birefringent crystals 310, 320, 330, 340, 350, and 360. As noted above in connection with FIG. 1, one or more optical elements may be positioned between any of birefringent crystals 310–360. Further, other optical components, such as polarizers, splitters, or combiners, may precede and/or follow birefringent crystals 310–360 in an optical transmission path. Each of birefringent crystals 310–360 may be cut and oriented so that its optical axis in the plane of the optical face is perpendicular (within tolerance) to the direction of light propagation.

Birefringent crystals may be considered as pairs 310 and 320, 330 and 340, and 350 and 360, with crystals 320, 340, and 360 selected to offset thermal variations in $\Delta n$ and thickness $l$ of crystals 310, 330, and 350, respectively. Accordingly, each of the crystal pairs 310 and 320; 330 and 340; and 350 and 360 will have a substantially constant net $\Delta n \cdot l$ product. Moreover, analogous to that described in connection with FIG. 1, the specific value of the net $\Delta n \cdot l$ product can be selected economically with a high degree of precision by tilting one or both of the crystals in the pair. According to one embodiment, crystals 320, 340, and 360 may be tilted about tilt axes W1, W2, and W3, respectively.

For simplicity, if we assume that birefringent crystals 310, 330, and 350 are made from the same material having parameter $\Delta n_1$ and the same length $l_1$ and birefringent crystals 320, 340, and 350 are made from the same material having parameter $\Delta n_2$ and length $l_2$, the impulse response of the arrangement is:

$$h(t) := C_0 \delta(0) + C_1 \delta(t-\Delta\tau) + C_2 \delta(t-2\Delta\tau) + C_3 \delta(t-3\Delta\tau) \quad (1)$$

where: $\Delta\tau := \Delta n \cdot l / c$ (2)

and $\Delta n \cdot l = \Delta n_1 \cdot l_1 - \Delta n_2 \cdot l_2$ and c is the velocity of light in a vacuum.

The frequency of response of the arrangement is:

$$H(f) := C_0 + C_1 e^{-ik\Delta n \cdot l} + C_2 e^{-2ik\Delta n \cdot l} + C_3 e^{-3ik\Delta n \cdot l}$$

where $k := 2\pi f/c = 2\pi/\lambda$ and where k is wavelength of light.

While the example of FIG. 3 includes three pairs of crystals, it should be understood that any number of crystal pairs may be used consistent with the present invention. The i-th coefficient of the series equals the number of crystal pairs needed (in this example, 3). The coefficients values $(C_0, C_1, \ldots C_i)$ are determined by the rotation angle of the crystals, with each crystal contributing to each coefficient value. Because the frequency response in general approximates the Fourier series, any particular response may be approximated by appropriate selection of the variables, including the number of crystal pairs.

Figure 4:
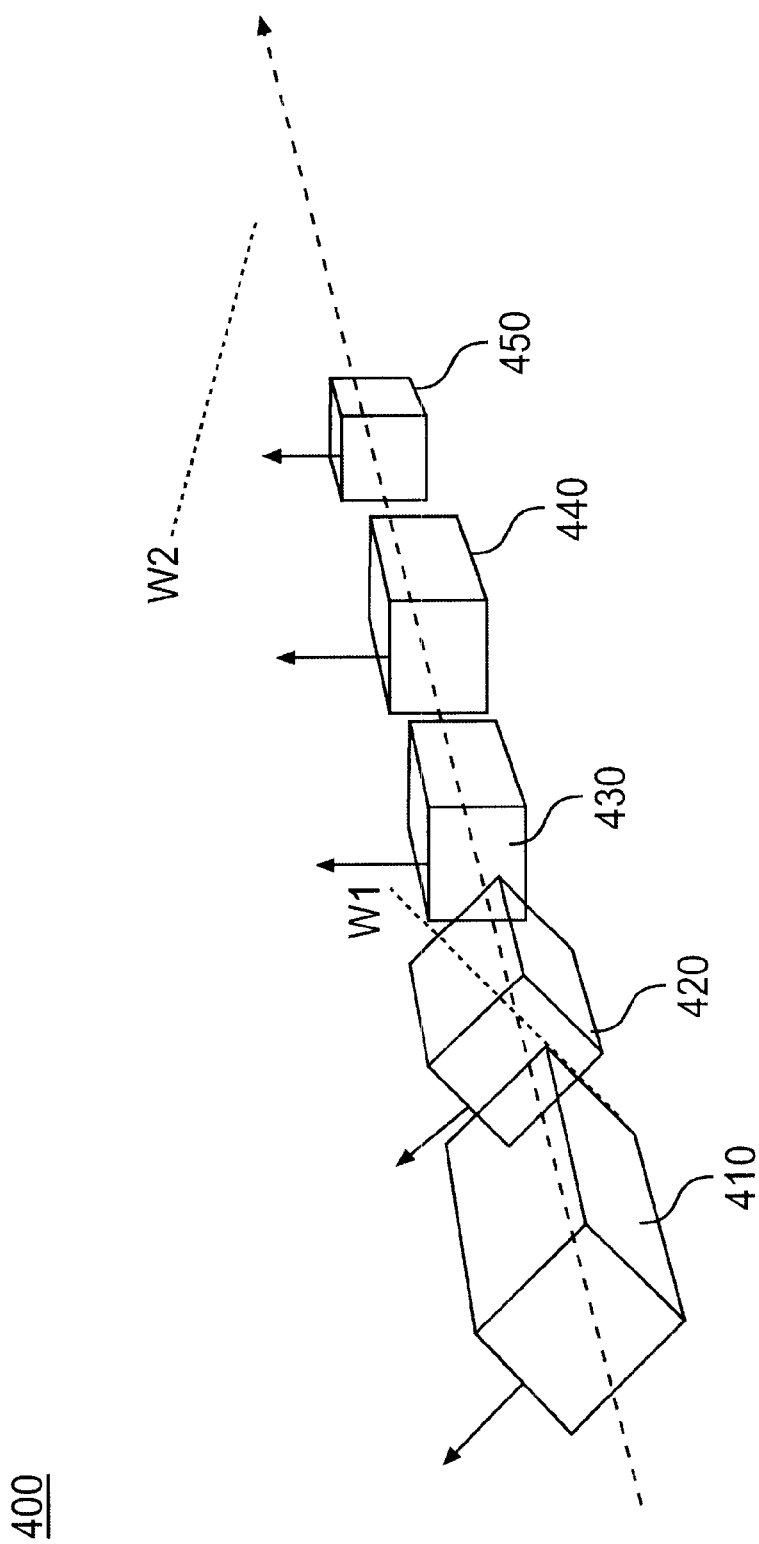
FIG. 4 illustrates a birefringent optical device in accordance with a further exemplary embodiment of the present invention.

FIG. 4 illustrates a further exemplary embodiment of an optical device in accordance with the present invention. As shown in FIG. 3, optical device 400 includes multiple birefringent crystals 410, 420, 430, 440, and 450. As noted above in connection with FIG. 1, one or more optical elements may be positioned between any of birefringent crystals 410–450. Further, other optical components, such as polarizers, splitters, or combiners, may precede and/or follow birefringent crystals 410–450 in an optical transmission path. Each of birefringent crystals 410–450 may be cut and oriented so that its optical axis in the plane of the optical face is perpendicular (within tolerance of the application) to the direction of light propagation.

In FIG. 4, the optical axes of crystals 430 and 440 are substantially parallel. Consequently, the length of birefringent crystal 450 may be selected to compensate for the thermal variation of both crystal 430 and crystal 440. As above, crystal 450 may be tilted about tilt axis W2 to precisely tune the frequency response of the arrangement. As shown in FIG. 4, the tilt axis W2 need not intersect crystal 450. Similarly, crystal 420 may be tilted about tilt axis W1, as described above.

It should be understood that while the example of FIG. 4 that a single bifrefringent compensation crystal 450 may be used to compensate for multiple birefringent crystals of the optical device. The embodiment of FIG. 4 is intended as an example. Multiple variations are possible. For example, more than three crystals 410, 430, and 440 may be provided consistent with the present invention.

Figure 5:
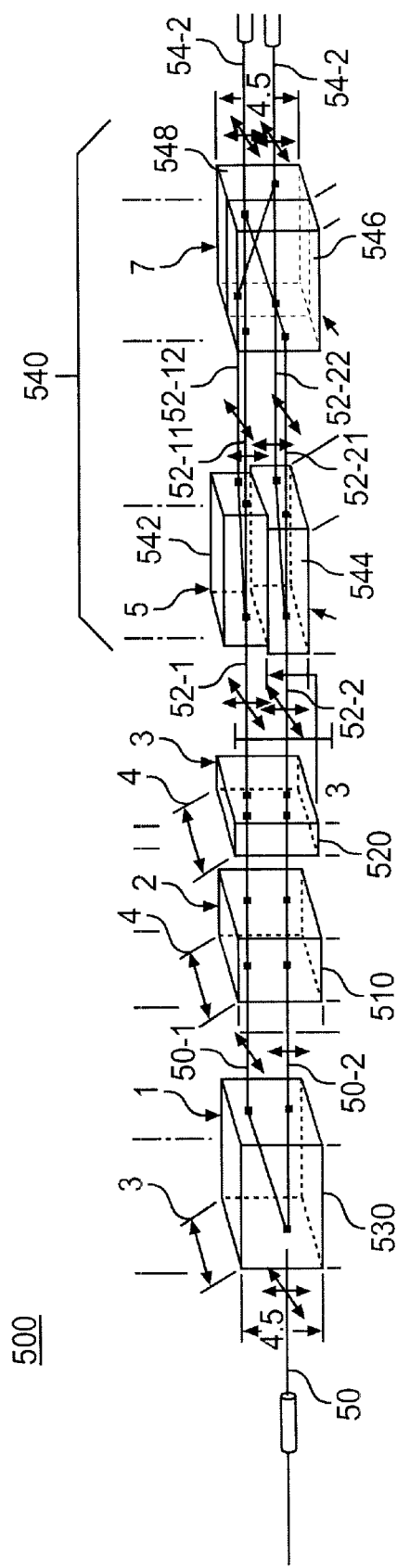
FIG. 5 shows an exemplary embodiment of an interleaver in accordance with the present invention.

FIG. 5 illustrates an exemplary embodiment of an interleaver 500. The interleaver 500 includes a first birefringent crystal 510 and a second birefringent crystal 520, similar to crystals 110 and 120 described above in connection with FIG. 1. Of course, one or more additional birefringent crystals and other optical components may be used in together with crystals 510 and 520, as discussed above in connection with FIGS. 3 and 4. In addition, interleaver 500 includes a birefringent crystal 530 and a polarization intermixer 540. Polarization intermixer 540 may have a design similar to that disclosed in U.S. application Ser. No. 09/815, 252, filed on Mar. 23, 2001, and incorporated herein by reference. Polarization intermixer 540 includes first and second splitter birefringent crystals 542, 544 and first and second combiner birefringent crystals 546, 548. Of course, interleaver 500 may include additional optical components other than those shown in FIG. 5.

A n optical signal beam 50, such as a WDM optical signals beam, may be aimed at birefringent crystal 530. Birefringent crystal 530 separates the optical signal beam 50 into two spatially-separate, orthogonal polarization components 50-1 and 50-2. As shown in FIG. 5, the two polarization components may be horizontal and vertical polarization components of the signal beam 50. Each of the polarization components 501 and 50-2 include the entire information content of optical signal beam 50.

Polarization component beams 50-1 and 50-2 are directed to the first and second birefringent crystals 510 and 520. Birefringent crystals 510 and 520 are tuned to a selected frequency response, as described above, by tilting one or both of birefringent crystals 510 and 520 relative to the direction of propagation of beams 50-1 and 50-2. Moreover, as described above, the materials and orientation of crystals 510 and 520 may be selected to provide a stable frequency response through a desired temperature range, such as 60°–70° C. or more.

First and second birefringent crystals 510 and 520 selectively filter beams 50-1 and 50-2 in accordance with the desired frequency response to produce beams 52-1 and 52-2. Because the polarization of input beam 50-1 is orthogonal to input beam 50-2, crystals 510 and 520 generate beams 52-1 and 52-2 having complementary polarizations.

Beams 52-1 and 52-2 are input to birefringent splitter crystals 542 and 544, respectively. Splitter crystal 542 splits beam 52-1 into two spatially-separate, orthogonal polarization component beams 52-11 and 52-12. Splitter crystal 544 splits beam 52-2 into two spatially-separate, orthogonal polarization component beams 52-21 and 52-22. Beams 52-11 and 52-21 are provided to combiner birefringent crystal 546, which combines the beams to produce an output signal 54-1. Beams 52-12 and 52-22 are provided to combiner birefringent crystal 548, which combines the beams to produce an output signal 54-2. Output signals 54-1 and 54-2 may represent interleaved frequency channels of input signal 50. For example, if optical signal 30 includes channels 1, 2, 3, 4, 5, 6, . . . , N, then output signals 54-1 would include channels 1, 3, 5, . . . and output signal 34-2 would include channels 2, 4, 6, . . . .

Interleaver 500 may form part of a multiplexer, a demultiplexer, or a combination multiplexer/demultiplexer. Moreover, optical devices according to the present invention may be used in dispersion compensation device, various optical filter applications, optical receivers, optical switches, and passive gain equalizers, among other optical equipment for use in optical telecommunications, optical computing, optical storage, and other applications.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

We claim:

1. An optical device, comprising:

a first birefringent crystal having a refractive index difference $\Delta n_1$ and a light path length $l_1$; and a second birefringent crystal having a refractive index difference $\Delta n_2$ and a light path length $l_2$, the first and second birefringent crystals being optically aligned and oriented so that a face of the first birefringent crystal and a face of the second birefringent crystal permit at least one optical beam to enter the face of the second birefringent crystal, and pass through the second birefringent crystal, wherein the face of the first birefringent crystal and the face of the second birefringent crystal are tilted relative to each other so as to achieve a path length of the at least one optical beam through the first and second birefringent crystals that provides a predetermined spectral response and wherein a temperature variation of the product of the refractive index difference $\Delta n_1$ and the light path length $l_1$ is compensated by a temperature variation of the product of the refractive index difference $\Delta n_2$ and the light path length $l_2$ over a desired operating temperature range.

2. The optical device of claim 1, wherein as temperature increases within the operating temperature range, $\Delta n_1$ increases and $\Delta n_2$ decreases.

3. The optical device of claim 1, wherein as temperature increases within the operating temperature range, $\Delta n_2$ increases and $\Delta n_1$ decreases.

4. The optical device of claim 1, wherein as temperature increases within the operating temperature range, $\Delta n_1$ increases and $\Delta n_2$ increases.

5. The optical device of claim 1, wherein as temperature increases within the operating temperature range, $\Delta n_2$ decreases and $\Delta n_1$ decreases.

6. The optical device of claim 1, wherein the first birefringent crystal comprises $YVO_4$.

7. The optical device of claim 1, wherein the first birefringent crystal comprises $TeO_2$.

8. The optical device of claim 1, wherein the second birefringent crystal comprises $PbMO_4$.

9. The optical device of claim 1, further comprising:

a base for supporting the first and second birefringent crystals; and a tilt arm for tilting the second birefringent crystal about a tilt axis.

10. The optical device of claim 9, further comprising a tilt adjuster for controlling the tilt angle of the second birefringent crystal.

11. The optical device of claim 10, wherein the base includes a rotator that holds the first birefringent crystal and the tilt arm holds the second birefringent crystal, the tilt arm being operatively coupled to the rotator.

12. The optical device of claim 1, wherein the at least one optical beam comprises first and second optical beams, the polarization of the first optical beam being orthogonal to the polarization of the second optical beam, the optical device further comprising:

a polarization splitter for spatially separating an input optical beam into a first polarization component beam and a second polarization component beam, wherein the first and second polarization component beams being provided directly or indirectly to the first birefringent crystal as the first and second optical beams, respectively; and a polarization intermixer for receiving first and second filtered beams, each having first and second polarization components, and for combining the first polarization components of the first and second filtered beams to produce a first output beam and for combining the second polarization components of the first and second filtered beams to produce a second output beam, wherein the first and second filtered beams correspond to the first and second optical beams after passing through at least the first and second birefringent crystals.

13. The optical device of claim 12, wherein the polarization intermixer comprises first and second splitter birefringent crystals and first and second combiner birefringent crystals.

14. A method of manufacturing a birefringent optical device, comprising:

optically aligning an orienting a first birefringent crystal and a second birefringent crystal to permit a light beam to pass through the first and second birefringent crystals and so that the net product $\Delta n \cdot l$ for the combination of the first and second birefringent crystals is substantially constant over an operating range, wherein the first birefringent crystal has a refractive index difference $\Delta n_1$ and a light path length $l_1$ and the second birefringent crystal has a refractive index difference $\Delta n_2$ and a light path length $l_2$, and the net product $\Delta n \cdot l$ corresponds to the difference $\Delta n_1 \cdot l_1 - \Delta n_2 \cdot l_2$; and tilting the first birefringent crystal relative to the second birefringent crystal to adjust the light beam path length through the fist birefringent crystal and produce a predetermined spectral response in the light beam output from the first and second birefringent crystals.

15. The method of claim 14, wherein the step of optically aligning and orienting comprises aligning the first and second birefringent crystals so that the light beam passes through the first birefringent crystal and then the second birefringent crystal.

16. The method of claim 14, wherein the step of optically aligning and orienting comprises aligning the first and second birefringent crystals so that the light beam passes through the second birefringent crystal and then the first birefringent crystal.

17. The method of claim 14, wherein said step of tilting comprises tilting the first birefringent crystal about an axis perpendicular to the direction of light beam propagation.

18. The method of claim 14, wherein the optical device is an optical filter.

19. The method of claim 14, wherein the optical device is an interleaver.

20. The method of claim 14, wherein the light beam is a WDM optical signal beam.

21. A method of tuning a birefringent optical device, comprising:

optically aligning and orienting a first birefringent crystal and a second birefringent crystal to permit a light beam to pass through the first and second birefringent crystals, wherein the first birefringent crystal has a refractive index difference $\Delta n_1$ and a light path length $l_1$ and the second birefringent crystal has refractive index difference $\Delta n_2$ and a light path length $l_2$, and a temperature-dependent variation of the product of refractive index difference $\Delta n_1$ and light path length $l_1$ is compensated by a temperature-dependent variation in the product of the refractive index difference $\Delta n_2$ and $l_2$; and tilting the first birefringent crystal relative to the second birefringent crystal to adjust the light beam path length through the first birefringent crystal and produce a predetermined spectral response in the light beam output from the first and second birefringent crystals.

22. The method of claim 21, wherein the step of optically aligning comprising aligning the first and second birefringent crystals so that the light beam passes through the first birefringent crystal and then the second birefringent crystal.

23. The method of claim 21, wherein the step of optically aligning comprising aligning the first and second birefringent crystals so that the light beam passes through the second birefringent crystal and then the first birefringent crystal.

24. The method of claim 21, wherein said step of tilting comprises tilting the first birefringent crystal about an axis perpendicular to the direction of light beam propagation.

25. The method of claim 21, wherein the optical device is an optical filter.

26. The method of claim 21, wherein the optical device is an interleaver.

27. The method of claim 21, wherein the light beam is a WDM optical signal beam.

28. An optical device, comprising:

a plurality of first birefringent crystals; and a plurality of second birefringent crystals, each of the second birefringent crystals corresponding to at least one of the first birefringent crystals, the first and second birefringent crystals being optically aligned and oriented so that at least one light beam passes through each of the first and second birefringent crystals and so that a temperature variation of each of the second birefringent crystals compensates for a temperature variation of its corresponding at least one first birefringent crystal over a desired operating temperature range, and wherein a face of at least one of the second birefringent crystals is tilted relative to the corresponding first birefringent crystal to vary the path length of the at least one light beam through the at least one second birefringent crystal to achieve a predetermined spectral response.

29. The optical device of claim 28, wherein at least one of the plurality of second birefringent crystals has a refractive index difference $\Delta n_2$ and a light path length $l_2$ and its corresponding first birefringent crystal has a refractive index difference $\Delta n_1$ and a light path length $l_1$ and wherein a temperature variation of the product of the refractive index difference $\Delta n_1$ and a light path length $l_1$ is compensated by a temperature variation of the product of the refractive index difference $\Delta n_2$ and the light path length $l_2$ over a desired operating temperature range.

30. The optical device of claim 29, wherein the first birefringent crystal corresponding to the at least one second birefringent crystal comprises $YVO_4$.

31. The optical device of claim 29, wherein the first birefringent crystal corresponding to the at least one second birefringent crystal comprises $TeO_2$.

32. The optical device of claim 29, wherein the at least one second birefringent crystal comprises $PbMO_4$.

33. The optical device of claim 28, wherein the at least one light beam comprises first and second optical beams, the polarization of the first optical beam being orthogonal to the polarization of the second optical beam, the optical device further comprising:

a polarization splitter for spatially separating an input optical beam into a first polarization component beam and a second polarization component beam, wherein the first and second polarization component beams being provided directly or indirectly to the plurality of first and second birefringent crystals as the first and second optical beams, respectively; and a polarization intermixer for receiving first and second filtered beams, each having first and second polarization components, said polarization intermixer combining the first polarization components of the first and second filtered beams to produce a first output beam and combining the second polarization components of the first and second filtered beams to produce a second output beam, wherein the first and second filtered beams correspond to the first and second optical beams after passing at least through the plurality of first and second birefringent crystals.

34. The optical device of claim 33, wherein the polarization intermixer comprises first and second splitter birefringent crystals and first and second combiner birefringent crystals.

* * * * *